(12) United States Patent
Remba Uribe et al.

(10) Patent No.: US 11,029,272 B2
(45) Date of Patent: Jun. 8, 2021

(54) SYSTEM AND METHOD FOR HOSE ASSEMBLY WITH DEGRADATION MONITORING

(71) Applicant: EATON INTELLIGENT POWER LIMITED, Dublin (IE)

(72) Inventors: David Samuel Remba Uribe, Carver, MN (US); Glenn J. Steffen, Chanhassen, MN (US)

(73) Assignee: Eaton Intelligent Power Limited, Dublin (IE)

( * ) Notice: Subject to any disclaimer, the term of this patent is extended or adjusted under 35 U.S.C. 154(b) by 173 days.

(21) Appl. No.: 16/448,157

(22) Filed: Jun. 21, 2019

(65) Prior Publication Data

US 2019/0391102 A1 Dec. 26, 2019

Related U.S. Application Data

(60) Provisional application No. 62/688,589, filed on Jun. 22, 2018.

(51) Int. Cl.

| G01N 27/20 | (2006.01) |
|---|---|
| F16L 33/207 | (2006.01) |
| F16L 55/42 | (2006.01) |
| G01M 5/00 | (2006.01) |

(Continued)

(52) U.S. Cl.
CPC .......... *G01N 27/20* (2013.01); *F16L 33/2071* (2013.01); *F16L 55/42* (2013.01); *G01M 5/0033* (2013.01); *G01M 10/00* (2013.01); *G01M 3/40* (2013.01)

(58) Field of Classification Search
CPC ........ G01N 27/00; G01N 27/02; G01N 27/04; G01N 27/20; F16L 33/00; F16L 33/20; F16L 33/207; F16L 33/2071; F16L 55/00; F16L 55/26; F16L 55/28; F16L 55/40; F16L 55/42; F16L 2201/00;
(Continued)

(56) References Cited

U.S. PATENT DOCUMENTS

| 4,480,480 A | * | 11/1984 | Scott | .................... | E02B 17/0034 |
|---|---|---|---|---|---|
| | | | | | 702/41 |
| 4,501,366 A | * | 2/1985 | Thompson | ............ | B07C 5/3404 |
| | | | | | 209/556 |

(Continued)

OTHER PUBLICATIONS

"Eaton LifeSense, Master catalog, assembly, installation and service manual," E-HOOV-TI001-E2 Oct. 2015, 58 pages.

*Primary Examiner* — Hoai-An D. Nguyen
(74) *Attorney, Agent, or Firm* — Merchant & Gould P.C.

(57) ABSTRACT

A system and method for a hose with degradation monitoring is disclosed. The system includes a sensor having one or more first alignment features, a contactless switch, and a light transmitter configured to transmit a light transfer protocol. A gateway device is configured to wirelessly receive data from the sensor, and includes one or more second alignment features that are configured to align with the one or more first alignment features, a trigger configured to activate the contactless switch only when the one or more second alignment features are aligned with the one or more first alignment features, and a phototransistor configured to capture and record the light transfer protocol transmitted from the light transmitter.

20 Claims, 16 Drawing Sheets

(51) Int. Cl.
 *G01M 10/00* (2006.01)
 *G01M 3/40* (2006.01)

(58) Field of Classification Search
 CPC ....... F16L 2201/30; G01M 3/00; G01M 3/38;
 G01M 3/40; G01M 5/00; G01M 5/0033;
 G01M 10/00
 USPC ......... 324/76.11, 117 R, 117 H, 200, 207.11,
 324/207.13, 207.2, 421, 500, 512, 525,
 324/557, 558, 600, 649, 691
 See application file for complete search history.

(56) References Cited

U.S. PATENT DOCUMENTS

| | | | |
|---|---|---|---|
| 5,268,952 A * | 12/1993 | Tarvainen | G01N 23/083 378/59 |
| 5,714,681 A * | 2/1998 | Furness | G01M 3/283 73/40.5 R |
| 8,984,107 B2 | 3/2015 | Fiennnes | |
| 9,228,919 B1 * | 1/2016 | Hawwa | G01M 3/38 |
| 9,288,528 B2 | 3/2016 | Fiennes | |
| 9,402,281 B1 | 7/2016 | Fiennes | |
| 9,435,709 B2 | 9/2016 | Hastreiter | |
| 9,535,024 B2 | 1/2017 | Betsinger | |
| 9,562,822 B2 | 2/2017 | Wells et al. | |
| 9,643,550 B2 | 5/2017 | Beining | |
| 9,677,967 B2 | 6/2017 | Pereira et al. | |
| 9,952,170 B2 | 4/2018 | Upasani et al. | |
| 9,967,149 B1 | 5/2018 | Fiennes | |
| 2010/0305870 A1 * | 12/2010 | Camilli | G01N 29/032 702/24 |
| 2014/0025795 A1 | 1/2014 | Fiennnes | |
| 2014/0150509 A1 * | 6/2014 | Wisler | A01G 25/023 72/17.3 |
| 2014/0366634 A1 * | 12/2014 | Sohn | G01N 21/1702 73/643 |
| 2015/0240972 A1 | 8/2015 | Betsinger | |
| 2019/0003499 A1 * | 1/2019 | Logan | G01M 11/086 |
| 2019/0265200 A1 * | 8/2019 | Ihn | G01M 5/0091 |

* cited by examiner

SYSTEM AND METHOD FOR HOSE ASSEMBLY WITH DEGRADATION MONITORING

CROSS-REFERENCE TO RELATED APPLICATIONS

This application claims priority to U.S. Provisional Patent Application 62/688,589 filed Jun. 22, 2018, the disclosure of which is incorporated herein by reference in its entirety.

BACKGROUND

High pressure reinforced hydraulic hoses are typically used on a variety of fluid power operated machines to provide a flexible connection between several moving parts of a hydraulic circuit employed on or within a machine. Such hoses may include a hollow polymeric inner tube on which successive cylindrical layers of reinforcing material, such as wire or textile, are concentrically applied to contain the radial and axial pressures within the inner tube.

Hydraulic hoses typically require demanding hose constructions with both high burst strength and long term fatigue resistance. Using conventional technology, the burst strength of a hydraulic hose may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

In some circumstances, it is desirable to detect, in a non-destructive and non-disruptive manner the likelihood of failure of a hydraulic hose while the hose is in operation. One solution connects a sensor having a monitoring circuit between two parallel, at least partially-conductive layers of a hose wall. A change in an electrical property observed by the monitoring circuit may indicate a change in a property of the hose wall structure that may indicate impending failure of the hose wall. Accordingly, the integrity of the hydraulic hose can be continuously monitored while the hose is in use and without disrupting the operation of the hose.

In some examples, sensors (one sensor per hydraulic hose) are connected to a gateway device via a wired connection. The gateway device can manage the communication and status of the multiple sensors. However, using wired connections can be cumbersome, especially if numerous hydraulic hoses are being monitored. Thus, in some alternative examples, the sensors can be connected to the gateway device via a wireless connection.

In wireless configurations, each sensor must be paired to the gateway device in order for that sensor to be able to communicate with the gateway device for transmitting the captured data observed by the monitoring circuit of the sensor. Extensive setup and programming are often required in order for the gateway device to recognize the various wireless sensors mounted to the hydraulic hoses. The extensive setup and programming can be time-consuming.

Therefore, improvements are needed to simplify and reduce the time it takes to pair wireless sensors to a gateway device in a system that can continuously monitor the degradation status of a hydraulic hose without disrupting the operation of the hose.

SUMMARY

In general terms, the present disclosure is directed to a system and method for continuously monitoring the status of a hydraulic hose. In one possible configuration and by non-limiting example, the system and method utilize a mechanical interface and a light transfer protocol that reduce the time it takes to associate a wireless sensor to a gateway device.

In one aspect, the disclosed technology relates to a system for a hose with degradation monitoring, the system comprising: a sensor configured to attach to a hydraulic hose and to monitor a degradation status of the hydraulic hose, the sensor having: one or more first alignment features; a contactless switch adjacent to the one or more first alignment features; and a light transmitter located adjacent to the one or more first alignment features, and configured to transmit a light transfer protocol; and a gateway device configured to receive data from the sensor, the gateway device having: one or more second alignment features that are configured to align with the one or more first alignment features; a trigger switch adjacent to the one or more second alignment features, the trigger switch configured to activate the contactless switch only when the one or more second alignment features are aligned with the one or more first alignment features; and a phototransistor configured to record the light transfer protocol only when the contactless switch is activated.

In certain examples, the light transmitter is in a sleep mode when the one or more second alignment features are not aligned with the one or more first alignment features.

The contactless switch can be a hall effect sensor and the trigger switch a magnet.

In certain examples, the one or more first alignment features include parallel rails, and the one or more second alignment features include parallel grooves that match the parallel rails.

In some examples, the light transfer protocol includes a sensor unique identification code recognizable by the gateway device.

In some examples, the sensor is attached to a hydraulic hose. In certain examples, the sensor includes a body having one or more apertures, each aperture configured to receive a tie-wrap that can be tightened around a hydraulic hose for securing the sensor to the hydraulic hose.

In some examples, the gateway device is configured to send alerts containing information on the degradation status of the hydraulic hose to a mobile device. In some examples, the gateway device is configured to send data on the degradation status of the hydraulic hose for display on a customer portal.

In some examples, the system further comprises 1 to 100 additional sensors, each additional sensor configured to monitor a degradation status of a hydraulic hose, and comprising: one or more first alignment features; a contactless switch adjacent to the one or more first alignment features; and a light transmitter located adjacent to the one or more first alignment features, and configured to transmit a light transfer protocol.

In another aspect, the disclosed technology relates to a sensor configured to attach to a hydraulic hose and to monitor a degradation status of the hydraulic hose, the sensor comprising: one or more first alignment features; a contactless switch adjacent to the one or more first alignment features; and a light transmitter adjacent to the one or more first alignment features, the light transmitter configured to transmit a light transfer protocol; wherein the light transfer protocol is not transmitted unless the one or more first alignment features align with corresponding one or more second alignment features on a gateway device such that the contactless switch is activated by a trigger switch.

In certain examples, the one or more first alignment features include parallel rails configured to align with the one or more second alignment features.

In certain examples, the light transmitter is located between the parallel rails.

In certain examples, the sensor further comprises a body having one or more apertures, each aperture configured to receive a tie-wrap that can be tightened around a hydraulic hose for securing the sensor to the hydraulic hose. In certain examples, the sensor further comprises a flexible electronic circuit that extends from the body, the flexible electronic circuit configured to detect an electrical characteristic of a hydraulic hose.

In another aspect, the disclosed technology relates to a method of monitoring a degradation status of a hydraulic hose, the method comprising: providing a sensor having one or more first alignment features, a contactless switch, and a light transmitter; providing a gateway device having one or more second alignment features, a trigger switch, and a phototransistor, when the one or more second alignment features are aligned with the one or more first alignment features, the trigger switch activates the contactless switch and the light transmitter emits a light transfer protocol recordable by the phototransistor; and receiving data from the sensor, and using the gateway device to display the data on a customer portal to convey a degradation status of a hydraulic hose attached to the sensor.

In some examples, the method further comprises using the gateway device to send alerts on the degradation status of the hydraulic hose for display on a mobile device.

In certain examples, the method further comprises attaching the sensor to a hydraulic hose before aligning the first alignment feature with the second alignment feature. In other alternative examples, the method further comprises attaching the sensor to a hydraulic hose after recording the light transfer protocol from the sensor.

In some examples, the method further comprises providing 1 to 100 additional sensors, each additional sensor configured to monitor a degradation status of a hydraulic hose, and having a light transmitter configured to transmit a unique light transfer protocol that pairs each additional sensor to the gateway device.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
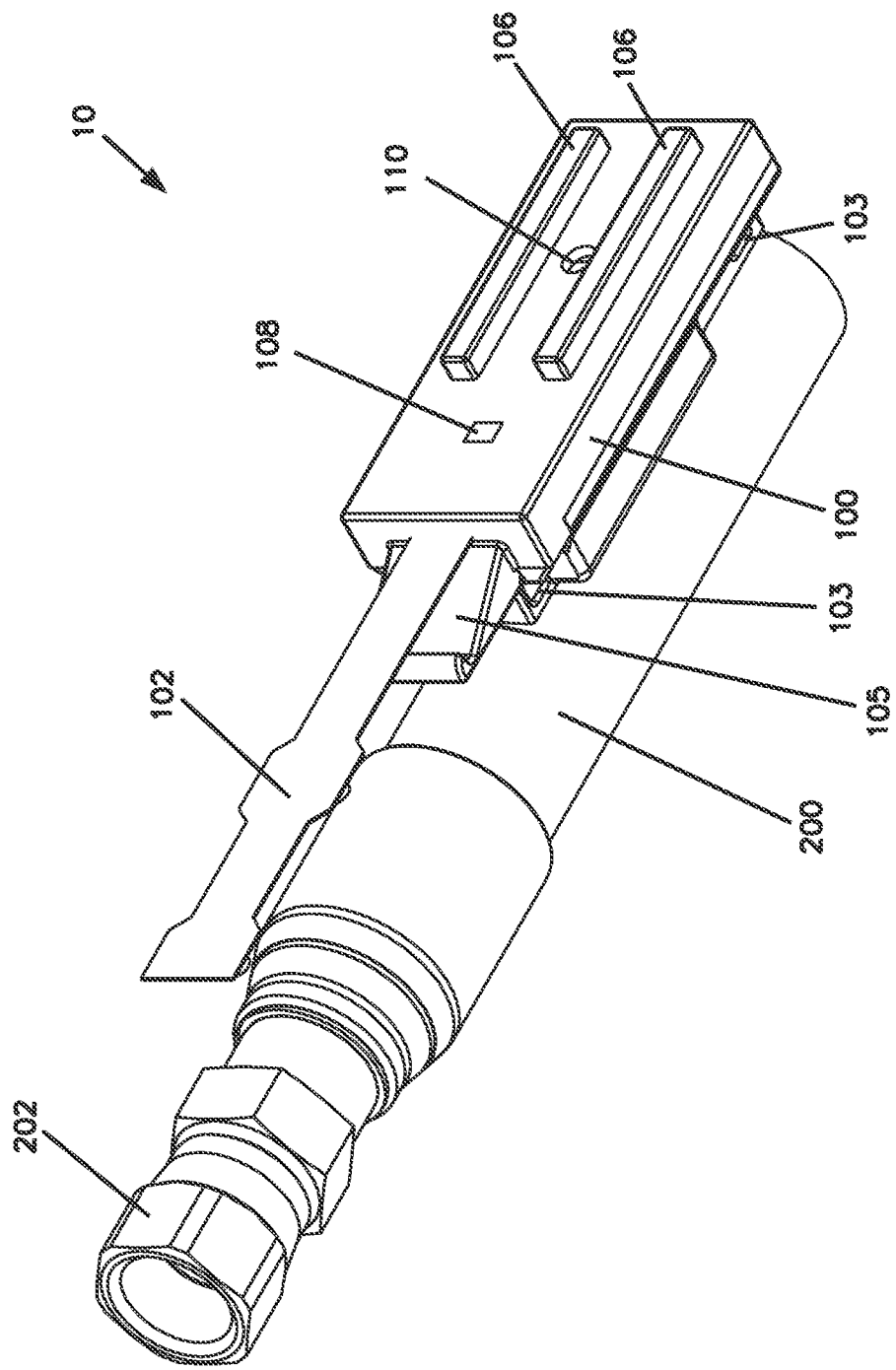
FIG. 1 is a perspective view of an exemplary hose assembly with degradation monitoring.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of a hose assembly 10 with degradation monitoring. As shown in FIG. 1, the hose assembly 10 includes a sensor 100 and a hydraulic hose 200.

The hydraulic hose 200 has a multi-layer construction that allows the hydraulic hose 200 to be generally flexible. The multi-layer construction includes an inner tube made from a polymeric material, such as rubber or plastic, or another material depending on the requirements of a particular application, a first conductive layer, an intermediate layer, a second conductive layer, and an outer cover. The first conductive layer and the second conductive layer define an electrical characteristic of the hydraulic hose 200, such as resistance.

The hydraulic hose 200 includes a nut 202 rotatably attached to an end of the hydraulic hose 200. The nut 202 provides a means for securing the hydraulic hose 202 to another component such as a fluid power operated machine or another hydraulic hose.

The sensor 100 is connectable over a portion of the hydraulic hose 200, such as the portion shown in FIG. 1. The sensor 100, when installed over the hydraulic hose 200, forms a physical and electrical connection with the hydraulic hose 200. In the example depicted in FIG. 1, the sensor 100 is a wireless sensor that is configured to wirelessly communicate the detected electrical characteristic of the hydraulic hose 200 to a gateway device.

Figure 2:
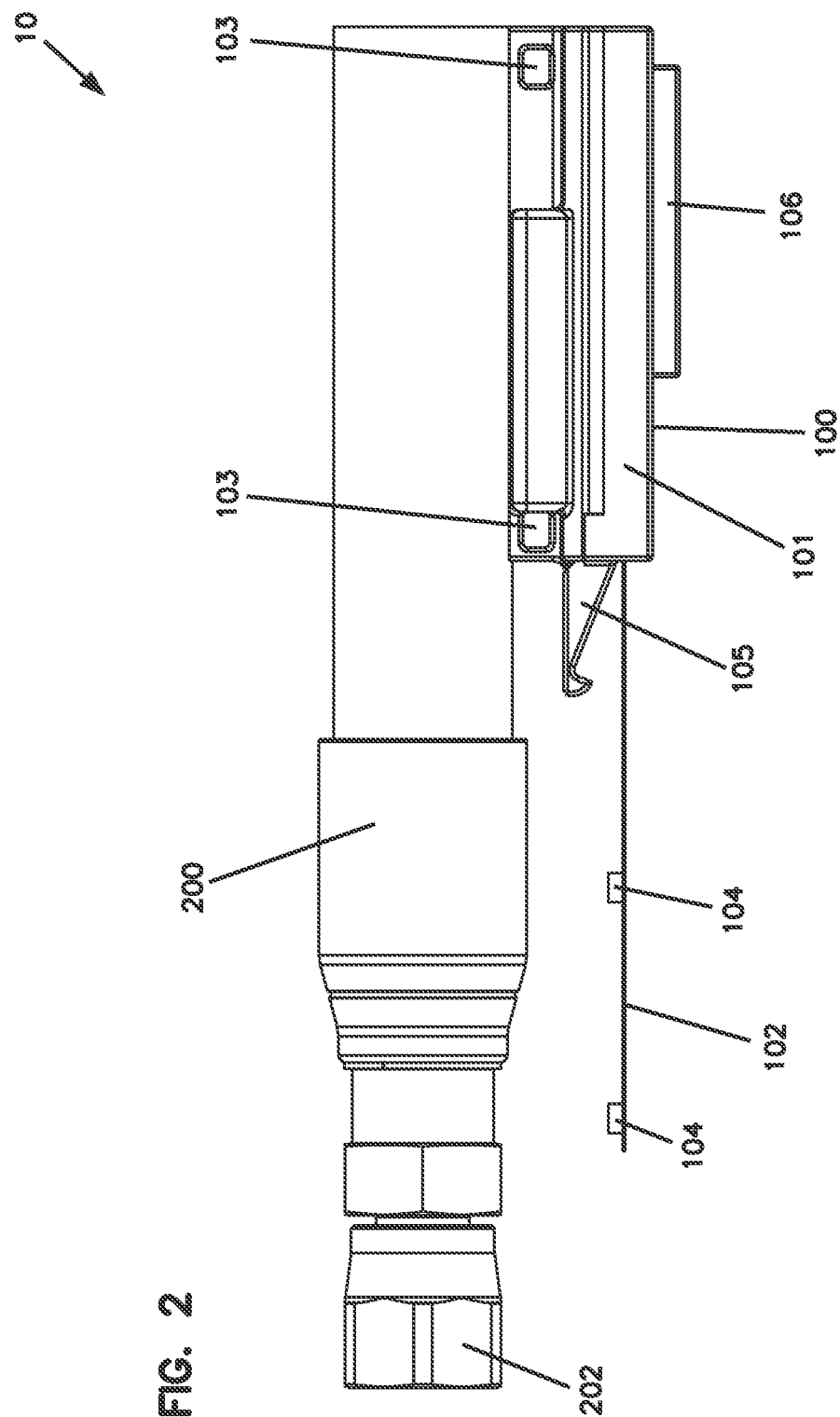
FIG. 2 is a top view of the hose assembly.

FIG. 2 is a top view of the hose assembly 10. As shown in FIG. 2, the sensor 100 includes a body 101 that has one or more apertures 103 that can each receive a tie-wrap (not shown) for securing the body 101 of the sensor 100 to the hydraulic hose 200. A tie-wrap can be inserted through each aperture 103, and can be tightened around the hydraulic hose 200. As also shown in FIG. 2, a lip 105 extends from the body 101 of the sensor 100.

Figure 3:
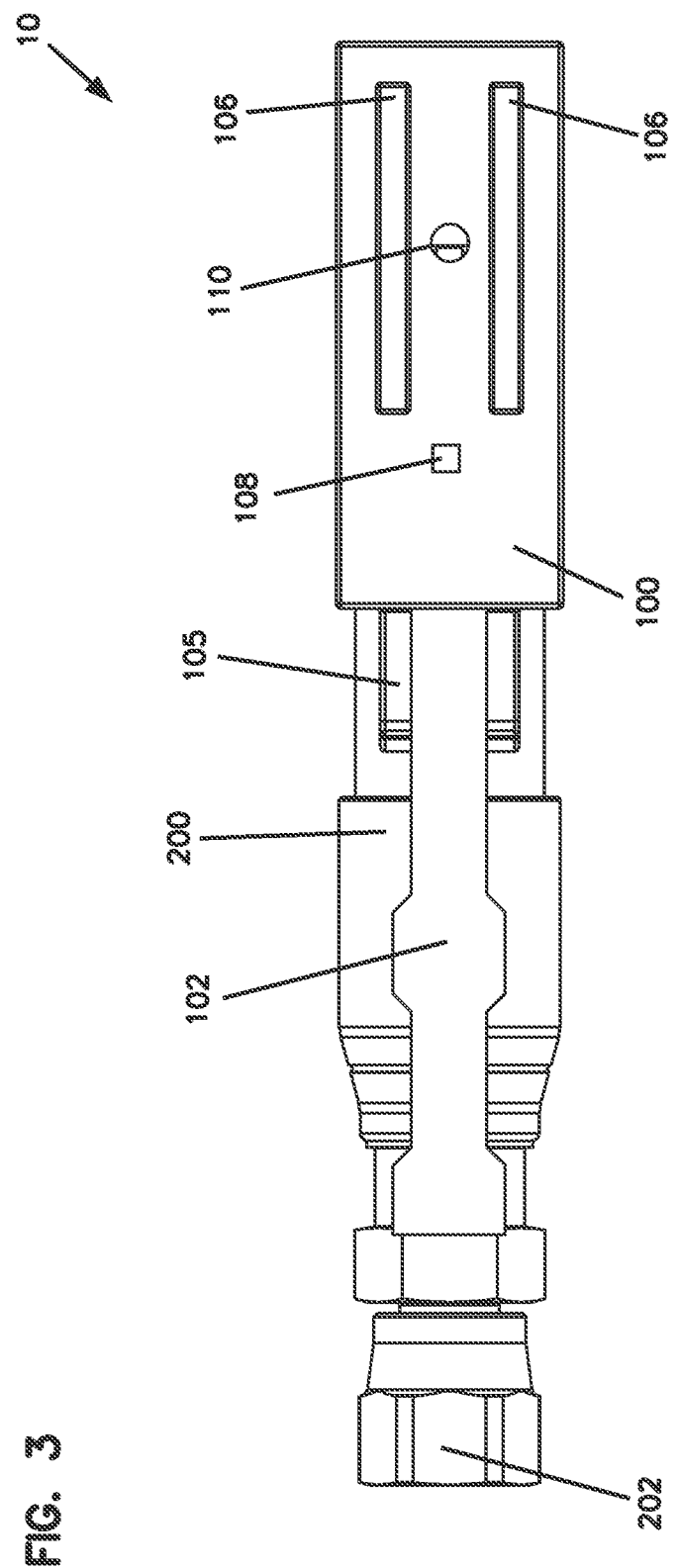
FIG. 3 is a side view of the hose assembly.

FIG. 3 is a side view of the hose assembly 10. As shown in FIGS. 1-3, the sensor 100 includes a flexible electronic circuit 102 that extends from the body 101 and that is positioned adjacent to the lip 105. The flexible electronic circuit 102 can detect an electrical characteristic of the hydraulic hose 200 such as the resistance between the first and second conductive layers of the hydraulic hose 200. Although not illustrated in the figures, the flexible electronic circuit 102 can be routed onto the hydraulic hose 200 such that magnetic contacts 104 (shown in FIG. 2) can make electrical contact with a fitting of the hydraulic hose 200 in multiple areas. This allows the sensor 100 to measure the electrical characteristic (e.g., resistance) between the first conductive layer and the second conductive layer. By continuously monitoring the electrical characteristic of the hydraulic hose 200, the sensor 100 can determine the remaining life of the hydraulic hose 200. When the magnetic contacts 104 are in electrical contact with the fitting of the hose, a heat shrink wrapping can cover the flexible electronic circuit 102 and the lip 105, as well as most of the end of the fitting of the hydraulic hose 200 for protection and environmental sealing.

As shown in FIGS. 1 and 3, the sensor 100 includes one or more first alignment features 106. In some examples, the one or more first alignment features 106 include parallel rails. In other alternative examples, the one or more first alignment features 106 include parallel grooves. In yet other alternative examples, the one or more first alignment features 106 include rails or grooves having a variety of geometric shapes and/or patterns.

As also shown in FIGS. 1 and 3, the sensor 100 includes a contactless switch 108 adjacent to the one or more first alignment features 106. In some examples, the contactless switch 108 is a hall effect sensor configured to detect the presence of a magnetic field.

Still referring to FIGS. 1 and 3, the sensor 100 includes a light transmitter 110 located adjacent to the one or more first alignment features 106. The light transmitter 110 is configured to emit a series of light impulses that collectively transmit a light transfer protocol in both visible and infrared wavelengths. In some examples, the light transmitter 110 is an LED or similar type of light source. The light transfer protocol emitted from the light transmitter 110 can transfer data from the sensor 100 to a gateway device 300 (shown in FIG. 4).

Figure 4:
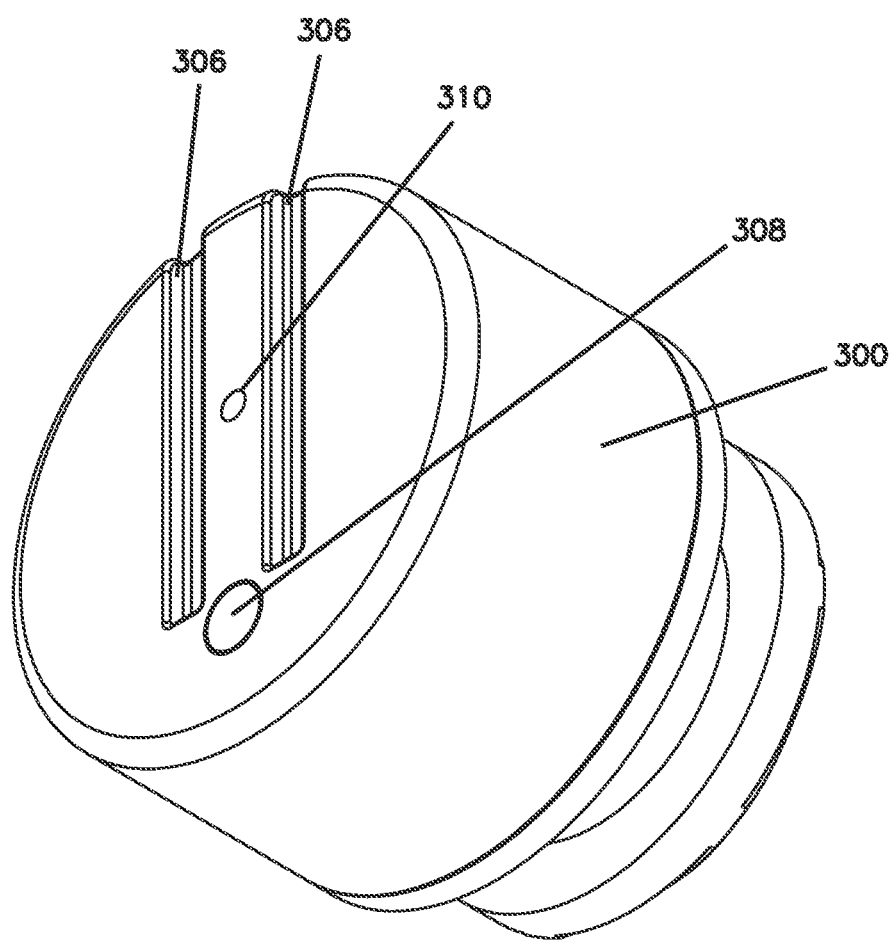
FIG. 4 is an isometric view of an exemplary gateway device that is suitable for use with the hose assembly of FIG. 1.

FIG. 4 is an isometric view of the gateway device 300. The gateway device 300 is configured to wirelessly communicate with the sensor 100. For example, measurements of the electrical characteristic that correspond to the degradation status (e.g., the remaining life) of the hydraulic hose 200 can be wirelessly transmitted from the sensor 100 to the gateway device 300. In some examples, the gateway device 300 can send alerts containing information on the degradation status (e.g., the remaining life) of the hydraulic hose 200 to a mobile device such as a cell phone, laptop computer, etc. In some examples, the gateway device 300 can send data on the degradation status (e.g., remaining life) of the hydraulic hose 200 for display on a customer portal. However, before wireless communication can be established between the gateway device 300 and the sensor 100, the gateway device 300 must be able to recognize the sensor 100. As described throughout this disclosure, the process for the gateway device 300 to recognize the sensor 100 is called "pairing" and this process will be described in more detail.

Figure 5:
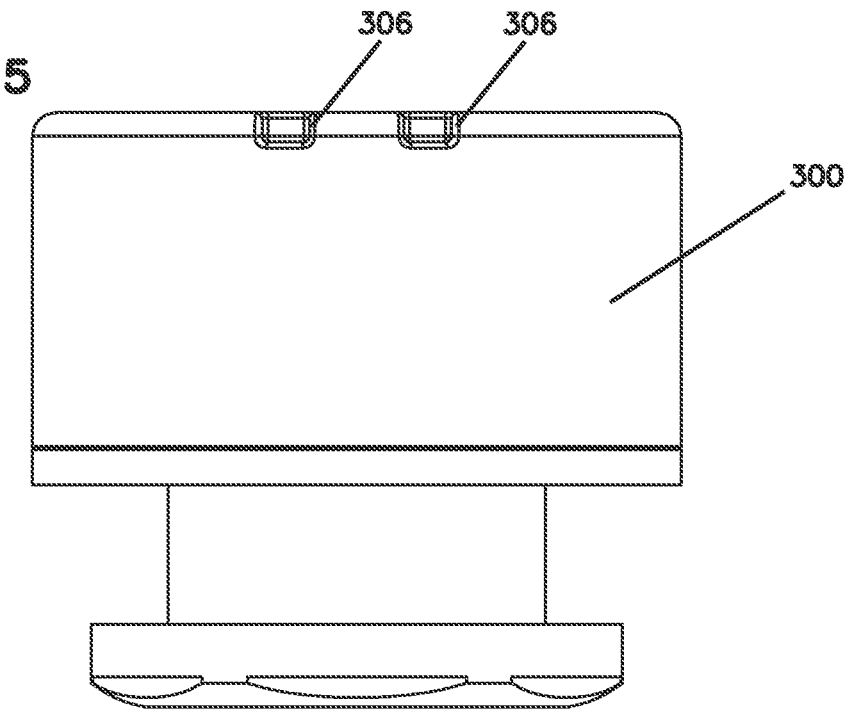
FIG. 5 is a top view of the gateway device.
Figure 6:
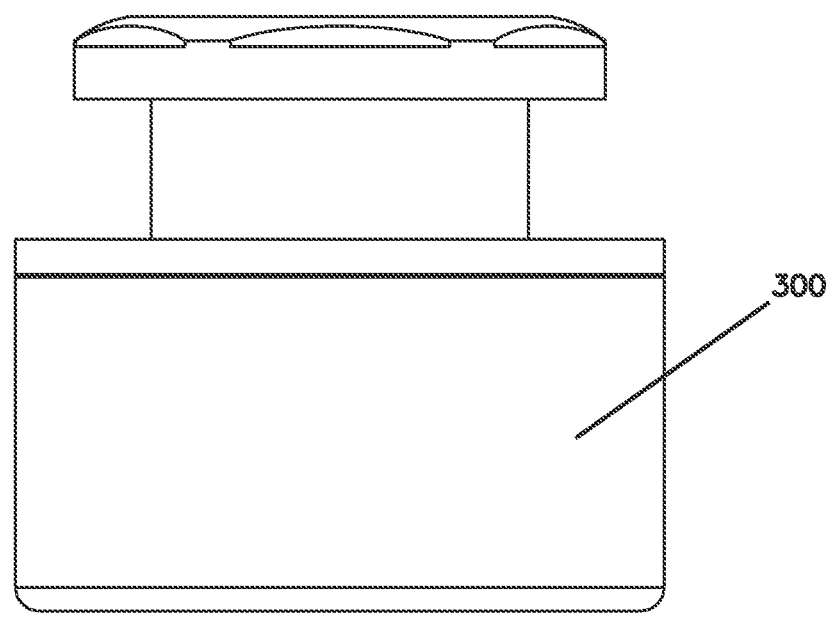
FIG. 6 is a bottom view of the gateway device.
Figure 7:
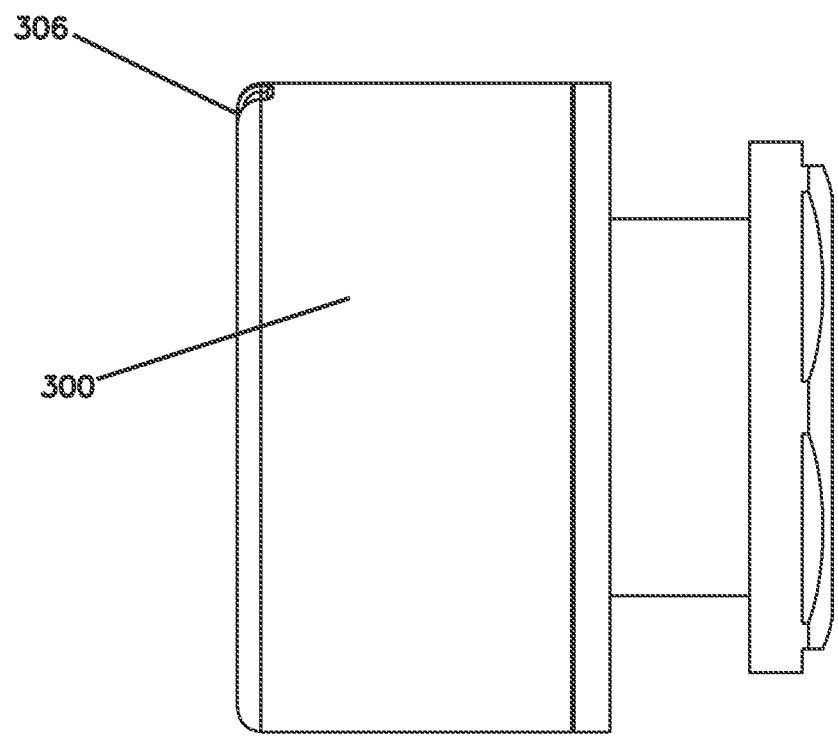
FIG. 7 is a side view of the gateway device.
Figure 8:
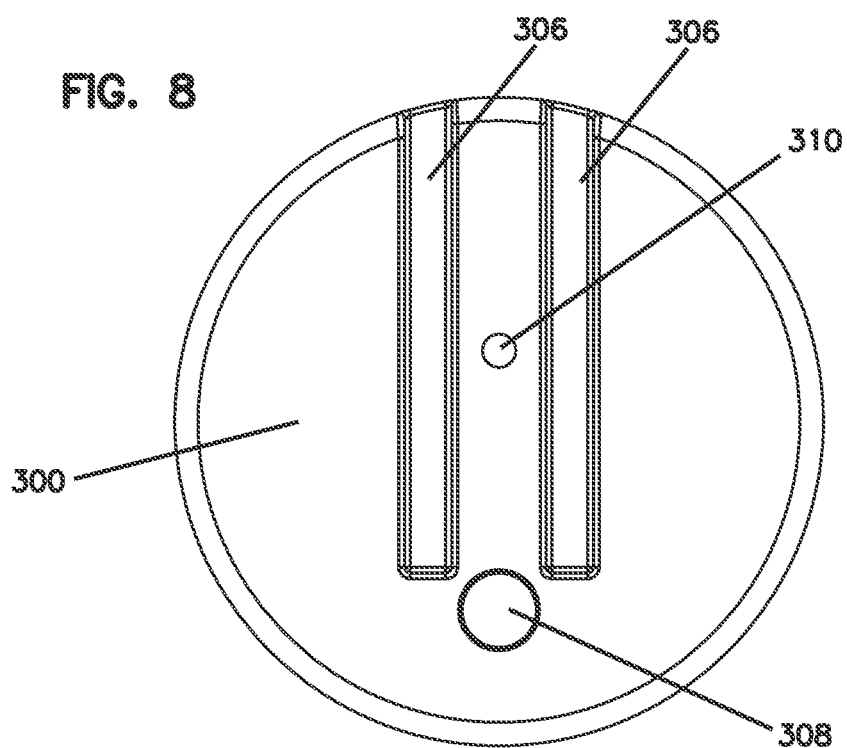
FIG. 8 is a front view of the gateway device.

FIG. 5 is a top view of the gateway device 300. FIG. 6 is a bottom view of the gateway device 300. FIG. 7 is a side view of the gateway device 300. FIG. 8 is a front view of the gateway device 300. As shown in FIGS. 4-8, the gateway device 300 includes one or more second alignment features 306 that are configured to align with the one or more first alignment features 106 of the sensor 100. In the example depicted in FIGS. 4-8, the one or more second alignment features 306 include parallel grooves that correspond to the parallel rails of the one or more first alignment features 106 depicted in FIGS. 1 and 3. The parallel rails of the one or more first alignment features 106 can be inserted into the parallel grooves of the one or more second alignment features 306 such that the sensor 100 can be aligned with the gateway device 300.

In other examples, the one or more second alignment features 306 include parallel rails that align with parallel grooves of the one or more first alignment features 106 on the sensor 100. In yet other alternative examples, the one or more second alignment features 306 include rails or grooves having a variety of geometric shapes and/or patterns that match corresponding geometric shapes and/or patterns of the one or more first alignment features 106 on the sensor 100.

As shown in FIGS. 4 and 8, the gateway device 300 includes a trigger switch 308 adjacent to the one or more second alignment features 306. The trigger switch 308 is configured to activate the contactless switch 108 of the sensor 100 only when the one or more second alignment features 306 are aligned with the one or more first alignment features 106 of the sensor 100 such that the gateway device 300 is aligned with the sensor 100. In some examples, the trigger switch 308 is magnet and the contactless switch 108 is a hall effect sensor that is configured to detect the presence of the magnetic field from the trigger switch 308.

Still referring to FIGS. 4 and 8, the gateway device 300 further includes a phototransistor 310 that is configured to detect light impulses from the light transmitter 110 of the sensor 100. In certain examples, the light transmitter 110 does not transmit light impulses unless the contactless switch 108 of the sensor 100 is activated by the trigger switch 308 of the gateway device 300. As described above, the trigger switch 308 is configured to activate the contactless switch 108 of the sensor 100 only when the gateway device 300 is aligned with the sensor 100. In such examples, the light transmitter 110 remains in a sleep mode unless the one or more second alignment features 306 are aligned with the one or more first alignment features 106 of the sensor 100 such that the trigger switch 308 is able to activate the contactless switch 108 of the sensor 100.

Figure 10:
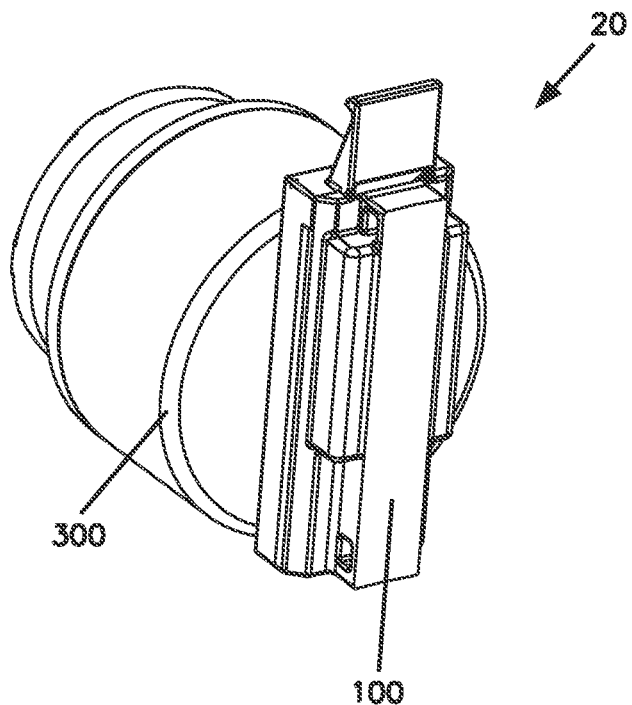
FIG. 10 is a front isometric view of a system for a hose with degradation monitoring having a sensor and a gateway device aligned together.
Figure 11:
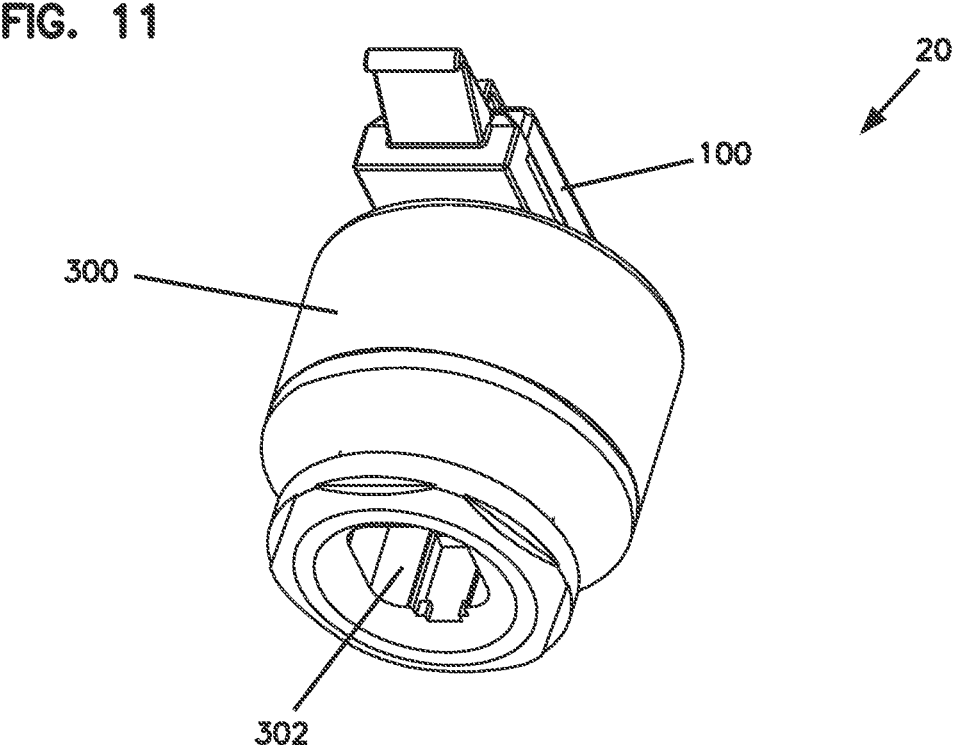
FIG. 11 is a rear isometric view of the system of FIG. 10.

FIGS. 10 and 11 are front and rear isometric views, respectively, of a system 20 for monitoring a degradation status of a hydraulic hose that includes the sensor 100 and the gateway device 300. As shown in FIGS. 10 and 11, when the sensor 100 and the gateway device 300 are aligned such that the one or more first alignment features 106 are fully engaged with the one or more second alignment features 306, the gateway device 300 is positioned such that the phototransistor 310 of the gateway device 300 is able to receive and record a light transfer protocol from the light transmitter 110 of the sensor 100. The light transfer protocol emitted from the light transmitter 110 can transfer data from the sensor 100 to a gateway device 300. In some examples, the data from the light transfer protocol can include a sensor unique identification code that is recognizable by the gateway device 300. In such examples, the light transfer protocol can be used to automatically pair the sensor 100 to the gateway device 300.

In the example depicted in FIGS. 10 and 11, the sensor 100 is shown detached from the hydraulic hose 200 when the sensor 100 is aligned with the gateway device 300 for pairing the sensor 100 to the gateway device 300. In alternative examples, the sensor 100 can be attached to a hydraulic hose (such as the hydraulic hose 200 depicted in FIG. 1) when the sensor 100 is aligned with the gateway device 300 due to the small size and portable nature of the gateway device 300 which can be carried to the hydraulic hose 200 for pairing with the sensor 100.

Multiple sensors (one sensor per hose) can be paired with the gateway device 300 in the manner described above. In some examples, 1 to about 99 additional sensors can be paired to the gateway device 300 such that the gateway device 300 can monitor up to 100 hydraulic hoses. Each additional sensor can include the one or more first alignment features 106, the contactless switch 108, and the light transmitter 110 described above.

Figure 9:
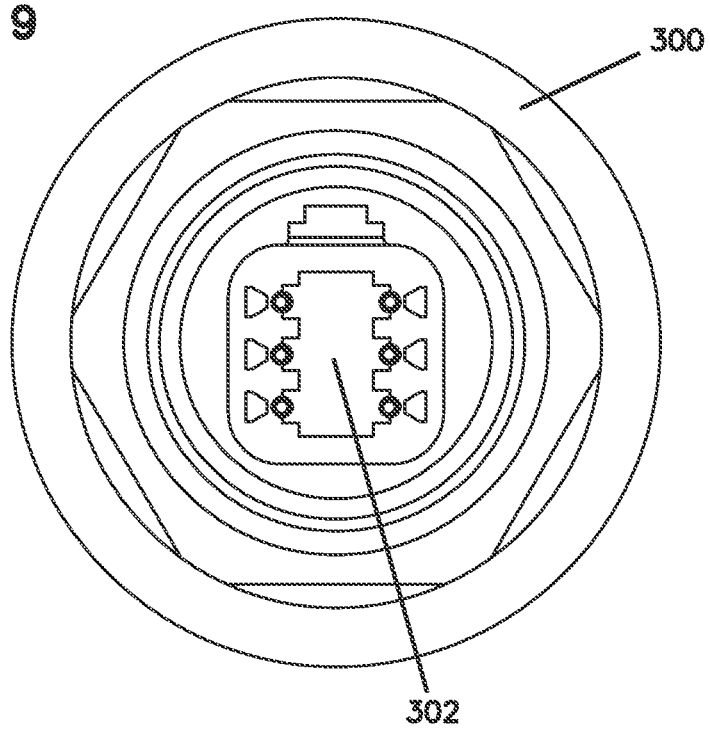
FIG. 9 is a rear view of the gateway device.

FIG. 9 is a rear view of the gateway device 300. As shown in FIGS. 9 and 11, the gateway device 300 includes a Controller Area Network (CAN) bus 302 for connecting the gateway device 300 to a fluid power operated machine or vehicle having at least one hydraulic hose monitored by the sensor 100 and having a CAN network embedded processor solution.

FIGS. 12A-12E illustrates exemplary light transfer protocols 112a-112e that can be transferred from the light transmitter 110 of the sensor 100 to the phototransistor 310 of the gateway device 300. The light transfer protocol transmits data optically. The light transfer protocol can transmit data in any optical frequency, including visible and infrared wavelengths, so long as the light transmitter 110 produces a sufficient amount of light at a given frequency and the phototransistor 310 can detect a sufficient amount of light at the same given frequency. The transfer is done at a variable and adaptive bit rate. As shown in FIGS. 12A-12E, each light transfer protocol includes a preamble 114, data package 116, and an end of communication 118.

Figure 12A:
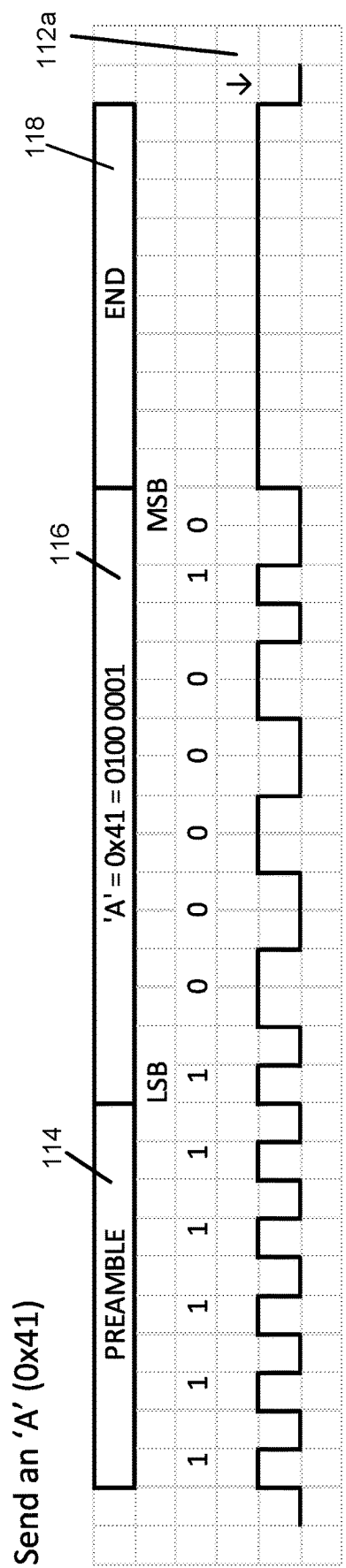
FIG. 12A illustrates an exemplary light transfer protocol that can be transferred from the sensor to the gateway device.
Figure 12B:
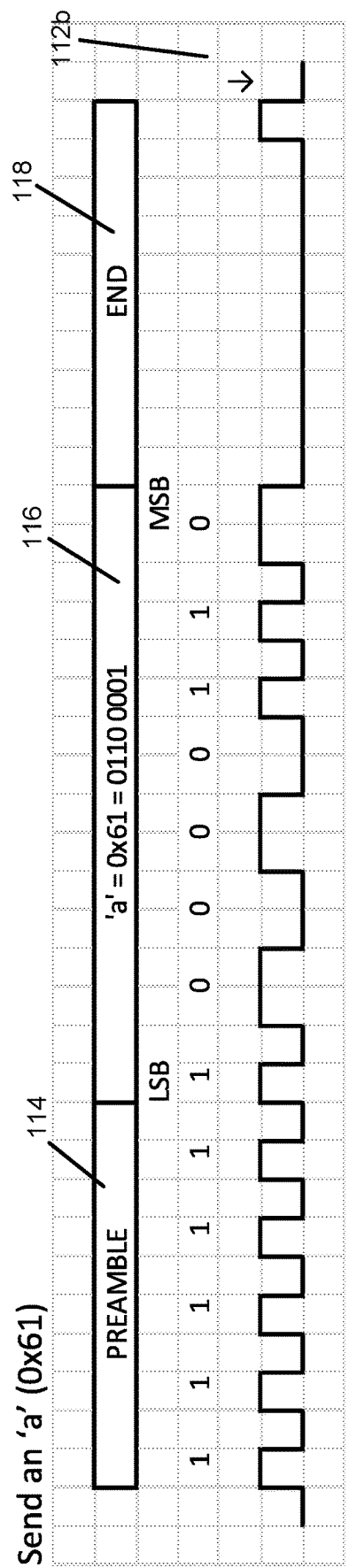
FIG. 12B illustrates another exemplary light transfer protocol.
Figure 12C:
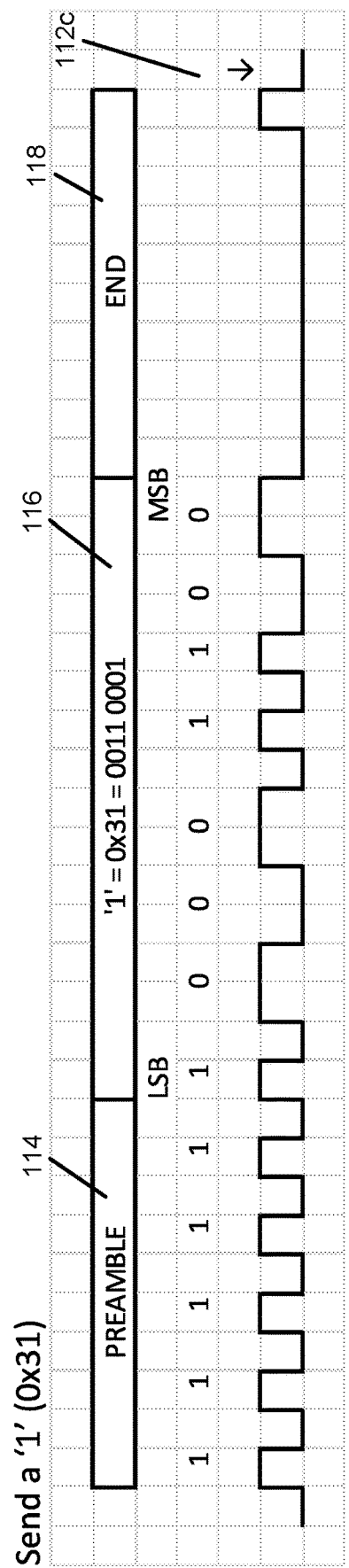
FIG. 12C illustrates another exemplary light transfer protocol.
Figure 12D:
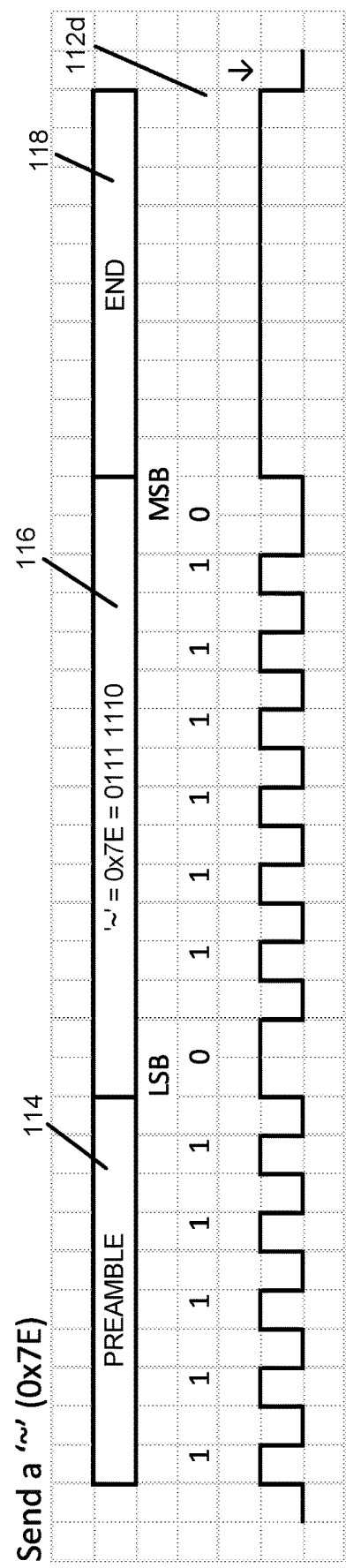
FIG. 12D illustrates another exemplary light transfer protocol.
Figure 12E:
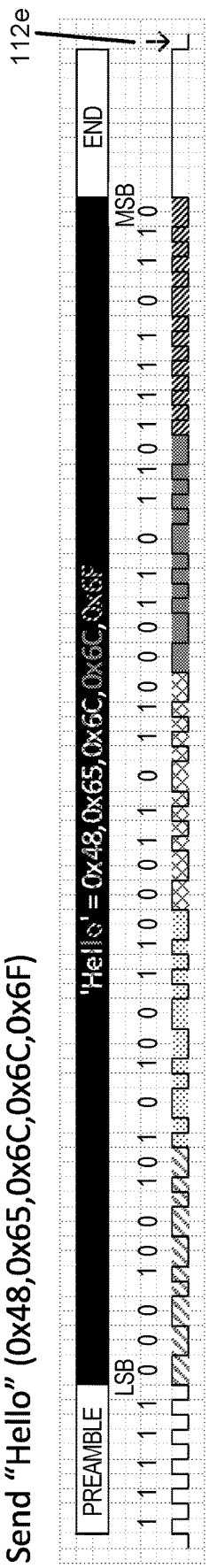
FIG. 12E illustrates another exemplary light transfer protocol.
Figure 12F:
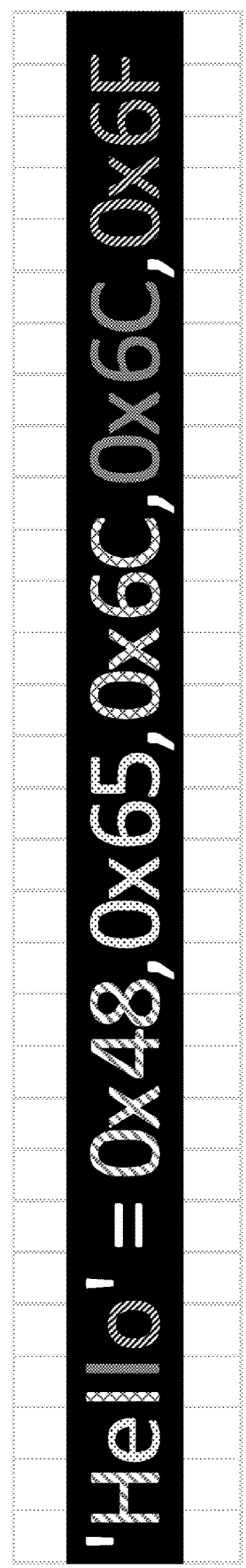
FIG. 12F illustrates a close up view of FIG. 12E.

FIG. 12A illustrates an exemplary light transfer protocol 112a that communicates the upper case letter "A". FIG. 12B illustrates an exemplary light transfer protocol 112b that communicates the lower case letter "a". FIG. 12C illustrates an exemplary light transfer protocol 112c that communicates the number "1". FIG. 12D illustrates an exemplary light transfer protocol 112d that communicates the symbol "~". FIG. 12E illustrates an exemplary light transfer protocol 112e that communicates the message "Hello". FIG. 12F illustrates a close up view of FIG. 12E showing the different hatching and stippling variants for the message "Hello" corresponding to the portions of the light transfer protocol 112e shown in FIG. 12F.

Figure 13:
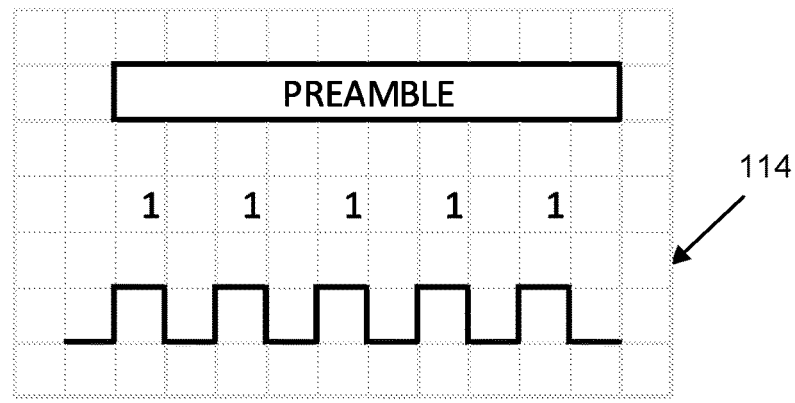
FIG. 13 illustrates an example preamble of a light transfer protocol.

FIG. 13 illustrates a preamble 114 of a light transfer protocol 112. As shown in FIG. 13, the preamble 114 starts with a rising edge and terminates in a falling edge. The preamble 114 includes a plurality of duty cycle clock pulses that define a bit timing. In some examples, the preamble 114 includes five duty cycle clock pulses. The bit timing is calculated as the average of the duration of the duty cycle clock pulses (½ of a clock cycle) with a tolerance of +/−35%. As an example, the calculated bit timing values can be used to determine that the number "1" is defined by a high level lasting the average bit timing+/−35% followed by a falling edge, and can be used to determine that the number "0" is a high or low level lasting twice the average bit timing+/−35% followed by a falling edge. Using the bit timing, the baud rate of the light transfer protocol 112 is auto-adjusted based on the preamble 114 sent before the data package 116.

Figure 14:
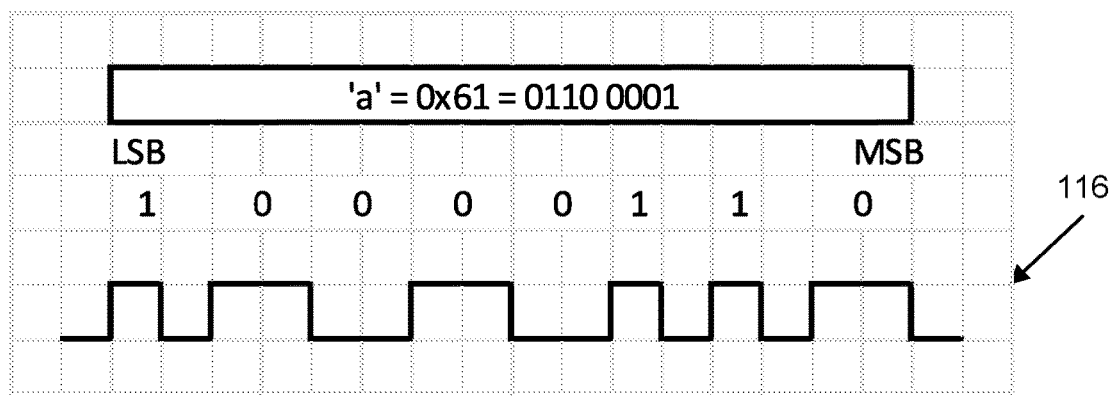
FIG. 14 illustrates an example data package of a light transfer protocol.

FIG. 14 illustrates a data package 116 of a light transfer protocol 112. The data package 116 follows the bit timing defined by the preamble 114, and can be as small as 1 byte and as long as 64 bytes (characters). In the data package 114, there are no markers between the bytes.

Figure 15:
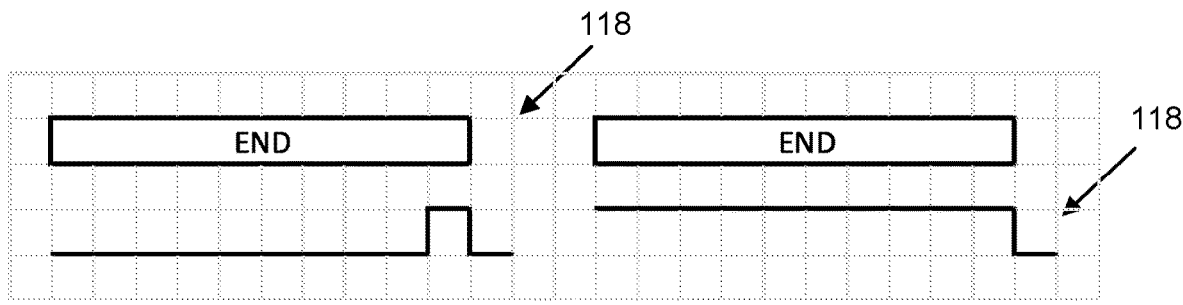
FIG. 15 illustrates an example end of communication of a light transfer protocol.

FIG. 15 illustrates an end of communication 118 of a light transfer protocol 112. In the light transfer protocol 112, the data package 116 is followed by a termination falling edge that occurs after predefined number of bit timing intervals. In some examples, the termination falling edge occurs after 10 bit timing intervals. During this wait time, the end of communication 118 has an output level defined by a last output level of the data package 116. If the output level was held low (e.g., the end of communication 118 on the left side of FIG. 15), a "1" is sent at the $9^{th}$ bit timing interval. If the output level was held high (e.g., the end of communication 118 on the right side of FIG. 15), the falling edge is performed on the $10^{th}$ bit timing interval. In some examples, after an end of communication 118, there is a minimum wait period (e.g., 6 bit timing intervals) before a new transmission of a light transfer protocol 112 can occur.

Figure 16:
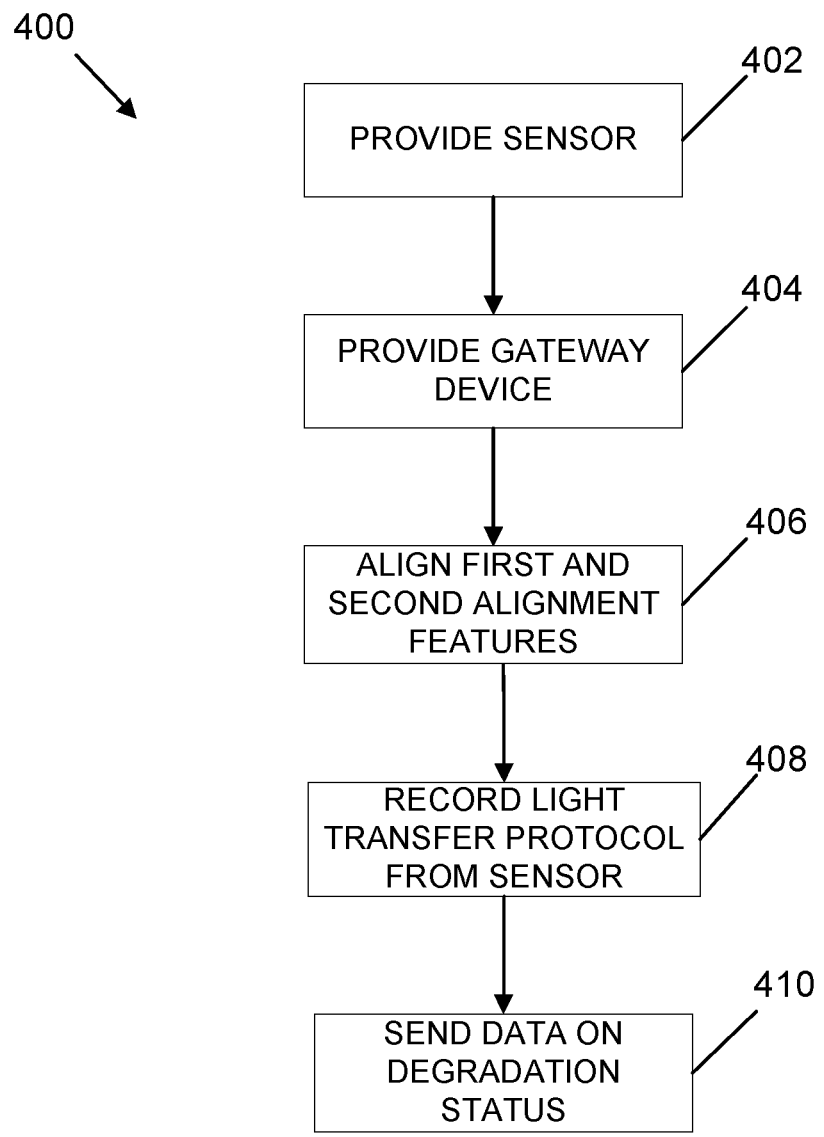
FIG. 16 illustrates a method of monitoring a degradation status of a hydraulic hose.

FIG. 16 illustrates a method 400 of monitoring a degradation status of a hydraulic hose that includes pairing a sensor to a gateway device. As shown in FIG. 16, the method 400 includes a step 402 of providing a sensor having one or more first alignment features, and a step 404 of providing a gateway device having one or more second alignment features.

Next, the method 400 includes a step 406 of aligning the one or more second alignment features with the one or more first alignment feature, and using a trigger switch on the gateway device to activate a contactless switch of the sensor. When the contactless switch is activated, the sensor transitions from a sleep mode to an active mode.

Thereafter, the method 400 includes a step 408 of using a phototransistor on the gateway device to record a light transfer protocol emitted from the sensor. In some examples, the light transfer protocol is a sensor unique identification code. The sensor unique identification code can be used to identify the sensor for pairing the sensor to the gateway device.

In some examples, the method 400 can include attaching the sensor to a hydraulic hose before aligning the one or more first alignment features with the one or more second alignment features. In alternative examples, the method 400 may include attaching the sensor to a hydraulic hose after using the phototransistor to record the light transfer protocol from the sensor.

Thereafter, the method 400 includes a step 410 of using the gateway device to send data on the degradation status of the hydraulic hose for display on a customer portal. In some examples, the step 410 includes using the gateway device to send alerts containing information on the degradation status of the hydraulic hose to a mobile device.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A system for a hose with degradation monitoring, the system comprising:

a sensor configured to attach to a hydraulic hose and to monitor a degradation status of the hydraulic hose, the sensor having:
- one or more first alignment features;
- a contactless switch adjacent to the one or more first alignment features; and
- a light transmitter located adjacent to the one or more first alignment features, and configured to transmit a light transfer protocol; and a gateway device configured to receive data from the sensor, the gateway device having:
- one or more second alignment features that are configured to align with the one or more first alignment features;
- a trigger switch adjacent to the one or more second alignment features, the trigger switch configured to activate the contactless switch only when the one or more second alignment features are aligned with the one or more first alignment features; and
- a phototransistor configured to record the light transfer protocol only when the contactless switch is activated.

2. The system of claim 1, wherein the light transmitter is in a sleep mode when the one or more second alignment features are not aligned with the one or more first alignment features.

3. The system of claim 1, wherein the contactless switch is a hall effect sensor, and the trigger switch is a magnet.

4. The system of claim 1, wherein the one or more first alignment features include parallel rails, and the one or more second alignment features include parallel grooves that match the parallel rails.

5. The system of claim 1, wherein the light transfer protocol includes a sensor unique identification code recognizable by the gateway device.

6. The system of claim 1, wherein the sensor is attached to a hydraulic hose.

7. The system of claim 1, wherein the sensor includes a body having one or more apertures, each aperture configured to receive a tie-wrap that can be tightened around a hydraulic hose for securing the sensor to the hydraulic hose.

8. The system of claim 1, wherein the gateway device is configured to send alerts containing information on the degradation status of the hydraulic hose to a mobile device.

9. The system of claim 1, wherein the gateway device is configured to send data on the degradation status of the hydraulic hose for display on a customer portal.

10. The system of claim 1, further comprising 1 to 100 additional sensors, each additional sensor configured to monitor a degradation status of a hydraulic hose, and comprising:
- one or more first alignment features;
- a contactless switch adjacent to the one or more first alignment features; and
- a light transmitter located adjacent to the one or more first alignment features, and configured to transmit a light transfer protocol.

11. A sensor configured to attach to a hydraulic hose and to monitor a degradation status of the hydraulic hose, the sensor comprising:
- one or more first alignment features;
- a contactless switch adjacent to the one or more first alignment features; and
- a light transmitter adjacent to the one or more first alignment features, the light transmitter configured to transmit a light transfer protocol;
- wherein the light transfer protocol is not transmitted unless the one or more first alignment features align with corresponding one or more second alignment features on a gateway device such that the contactless switch is activated by a trigger switch.

12. The sensor of claim 11, wherein the one or more first alignment features include parallel rails configured to align with the one or more second alignment features.

13. The sensor of claim 12, wherein the light transmitter is located between the parallel rails.

14. The sensor of claim 11, further comprising a body having one or more apertures, each aperture configured to receive a tie-wrap that can be tightened around a hydraulic hose for securing the sensor to the hydraulic hose.

15. The sensor of claim 14, further comprising a flexible electronic circuit that extends from the body, the flexible electronic circuit configured to detect an electrical characteristic of a hydraulic hose.

16. A method of monitoring a degradation status of a hydraulic hose, the method comprising:
- providing a sensor having one or more first alignment features, a contactless switch, and a light transmitter;
- providing a gateway device having one or more second alignment features, a trigger switch, and a phototransistor, when the one or more second alignment features are aligned with the one or more first alignment features, the trigger switch activates the contactless switch and the light transmitter emits a light transfer protocol recordable by the phototransistor; and
- receiving data from the sensor, and using the gateway device to display the data on a customer portal to convey a degradation status of a hydraulic hose attached to the sensor.

17. The method of claim 16, further comprising using the gateway device to send alerts on the degradation status of the hydraulic hose for display on a mobile device.

18. The method of claim 16, further comprising attaching the sensor to a hydraulic hose before aligning the first alignment feature with the second alignment feature.

19. The method of claim 16, further comprising attaching the sensor to a hydraulic hose after recording the light transfer protocol from the sensor.

20. The method of claim 16, further comprising:
- providing 1 to 100 additional sensors, each additional sensor configured to monitor a degradation status of a hydraulic hose, and having a light transmitter configured to transmit a unique light transfer protocol that pairs each additional sensor to the gateway device.

* * * * *